United States Patent
Graovac et al.

(10) Patent No.: US 7,759,909 B2
(45) Date of Patent: Jul. 20, 2010

(54) GENERATOR CONTROL CIRCUIT

(75) Inventors: Dusan Graovac, Munich (DE); Frank Auer, Roehrmoss (DE)

(73) Assignee: Infineon Technologies AG, Neubiberg (DE)

(*) Notice: Subject to any disclaimer, the term of this patent is extended or adjusted under 35 U.S.C. 154(b) by 410 days.

(21) Appl. No.: 11/847,700

(22) Filed: Aug. 30, 2007

(65) Prior Publication Data

US 2009/0058373 A1     Mar. 5, 2009

(51) Int. Cl.
    *H02P 9/14*     (2006.01)
(52) U.S. Cl. .......................................... 322/59; 322/28
(58) Field of Classification Search .................. 322/24, 322/25, 28, 37, 59, 99; 363/89, 52
    See application file for complete search history.

(56) References Cited

U.S. PATENT DOCUMENTS

| | | | |
|---|---|---|---|
| 4,496,898 A * | 1/1985 | Iwaki et al. .................... 322/34 |
| 4,910,451 A * | 3/1990 | Iwatani et al. .................. 322/28 |
| 5,631,544 A * | 5/1997 | Syverson et al. ............... 322/46 |
| 5,656,922 A * | 8/1997 | LaVelle et al. ................. 322/46 |
| 6,965,220 B2 * | 11/2005 | Kernahan et al. ............ 323/283 |
| 6,979,987 B2 * | 12/2005 | Kernahan et al. ............ 323/283 |
| 7,106,030 B2 * | 9/2006 | Isurin et al. .................... 322/59 |

* cited by examiner

*Primary Examiner*—Nicholas Ponomarenko
(74) *Attorney, Agent, or Firm*—Dicke, Billig & Czaja, PLLC

(57) ABSTRACT

A generator control circuit is disclosed. One embodiment provides a first active switching circuit configured to connect a first terminal of an excitation coil either to a first or to a second terminal of a voltage source, a second active switching circuit configured to connect a second terminal of the excitation coil either to the first or to the second terminal of the voltage source, and a generator controller to set the duty cycle of the active switching circuit to rapidly control the current through the excitation coil to an excitation coil current setpoint.

11 Claims, 6 Drawing Sheets

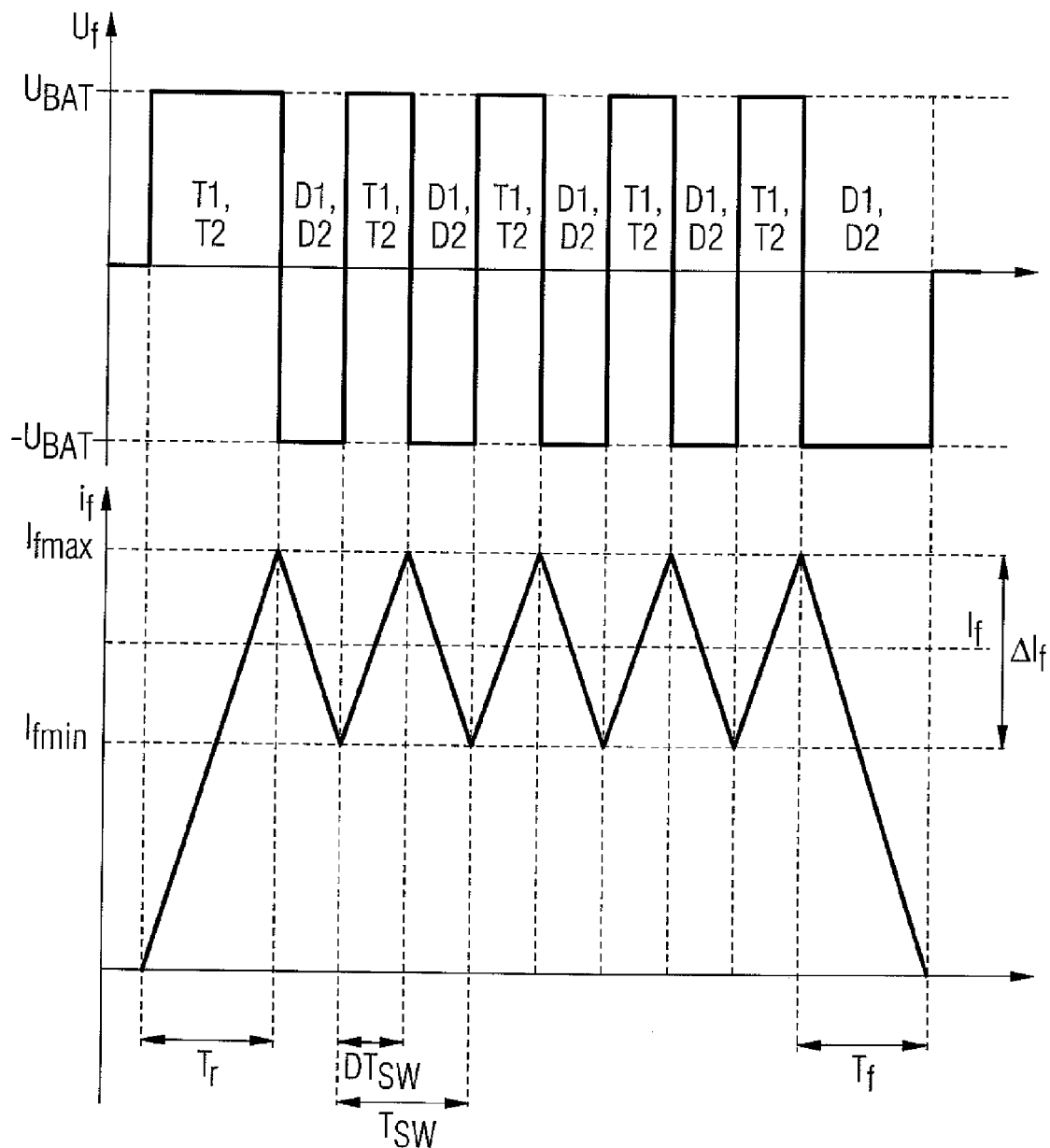

GENERATOR CONTROL CIRCUIT

BACKGROUND

The present invention relates to a control circuit for a generator, a generator assembly and methods for controlling the output voltage of a generator.

Generators are typically a primary electrical power source in a plurality of vehicles (automobiles, vessels, aircrafts). In the following, for illustration purposes, the invention will be described with reference to an automotive electric generator like, for instance, a Lundell machine. However, the invention is not so limited and may find its application in conjunction with any other type of generator.

One of the challenging problems regarding generators which provide electric power for a vehicle electrical system relates to the instability of the vehicle electrical system voltage, in particular in the case of sudden variations of the load of the generator. In this context, sudden variations of the load of the generator may relate to sudden load increases as well as sudden load decreases, which are also referred to as load dumps.

Conventionally, these load dumps require extensive precaution measures to accommodate the resulting voltage variations. In particular, compared to the requirements without consideration of these—partly extreme—voltage variations, the load dumps lead to an over dimensioning of the protective components and an over dimensioning of the breakthrough voltages of all (semiconductor) components which are connected to the vehicle electrical system.

For instance, for the 14 V vehicle electrical system of an automobile, typically semiconductors with a breakthrough voltage of 55 V to 60 V are required. FIG. 1 illustrates an overview of the specified voltages and voltage ranges related to a vehicle electrical system. The diagram in FIG. 1 illustrates that the maximum voltage $U_{loaddump}$ during a load dump may be specified for example as high as 45 V.

Referring to one example of a conventional generator assembly as illustrated in FIG. 2, a generator assembly 10 for a vehicle electrical system with a field regulator 11 is illustrated. The field regulator 11 used in the conventional generator assembly 10 of FIG. 2 is also known as a single quadrant chopping circuit or chopper because a current $i_f$ through a excitation coil 12 (also referred to as field current) and the corresponding excitation coil voltage $u_f$ (also referred to as field voltage) are either positive or zero at any given time. To simplify matters, the excitation coil 12 can be referred to by its inductance $L_f$.

The generator assembly 10 also includes a generator 15 (e.g., a Lundell alternator, also known as claw pole alternator), which may be a wound-field, 3-phase synchronous machine. The corresponding three output terminals of the generator 15 are coupled to a rectifier 16, e.g., a 3-phase avalanche bridge, to provide a rectified generator output voltage $U_{BN}$ to a vehicle electrical system.

In today's generator assemblies, it is typically merely the rectified generator output voltage $U_{BN}$ across the "+" and "−" terminals of the generator assembly which is measured, conditioned by a signal conditioning block 21 and compared with a rectified generator output voltage setpoint $U_{BN\_ref}$ (also referred to as reference voltage) within a generator controller 20. The signal conditioner 21, e.g., a filter with appropriate bandwidth, provides a feedback signal which is subtracted from the reference voltage $U_{BN\_ref}$. The resulting difference signal is received as input by a voltage controller 22. The voltage controller 22 controls a pulse width modulation (PWM) generator 23 that modulates the pulse width of a MOSFET (power) transistor T1 via a driver circuit 24, wherein the transistor T1 is in series with the excitation coil 12.

The duty cycle of the MOSFET transistor T1 is controlled such that the excitation coil current $i_f$ maintains the rectified generator output voltage $U_{BN}$ at a desired level for a given rotational speed of the generator 15 and load 30 of the generator assembly 10. I.e. the excitation coil current $i_f$ is the actuating variable of a control loop to control the rectified generator output voltage $U_{BN}$. A freewheeling diode D1 provides a freewheeling path for the excitation coil current $i_f$ during the periods when the MOSFET transistor T1 is switched off.

The corresponding control process within a conventional generator controller can be characterized as follows: If the rectified generator output voltage $U_{BN}$ is lower than the reference voltage $U_{BN\_ref}$, the duty cycle of the driving circuit 24 for field regulator 11 of the excitation coil 12 is increased. In case the rectified generator output voltage $U_{BN}$ is higher than the reference voltage $U_{BN\_ref}$, the duty cycle of the driving circuit 24 for the excitation coil 12 is reduced to zero. Hence, the degaussing of the excitation coil 12 is effected by the freewheeling diode D1.

Further with regard to FIG. 2, during a load dump, the generator assembly 10 is abruptly disconnected from the battery 40 and all or most part of the load 30. Consequently, the excitation coil current $i_f$ has to be reduced from a relatively high value needed for a high load to a relatively low value or even zero needed for the reduced or completely missing load.

Accordingly, the energy stored in the field of the excitation coil 12 causes a strong transient of the vehicle electrical system voltage $U_{BN}$ across the terminals "+" and "−" of the generator assembly 10 during a dump of the load 30. When a normal rectifier 16 is used, the peak of the voltage transients may reach levels multiple times the nominal generator output voltage $U_{nom}$. Moreover, the duration of the voltage transients may last in the order of several hundred milliseconds prior to dropping below a maximum specified generator voltage $U_{nom,max}$.

The peak transient generator output voltage may be clamped to acceptable levels by using, for example, avalanche rectifiers for the rectifier 16 which may absorb the excess generator output power until the magnetic field of the excitation coil 12 decays to lower levels. In a conventional generator assembly, the duration of a transient caused by a load dump depends—to the greatest extent—on the field time constant which results from using the field regulator 11 to control the current $i_f$ through the excitation coil 12. In the case of the example in FIG. 2, the excitation coil current $i_f$ as cause of magnetic field of excitation coil 12 decays at its natural rate through the freewheeling diode D1 when the MOSFET transistor T1 is turned off to disconnect the excitation coil 12 from the battery 40 in order to initiate the decay of the excitation coil current $i_f$.

Not only does the load dump energy cause a need for over dimensioning of protective components for the devices connected to the generator; in fact, since the load dump energy has to be absorbed by e.g., the avalanche rectifiers, it may require much larger devices or several devices of the rectifiers in parallel to secure reliable operation. This particularly holds for higher power generators. Hence, the above mentioned devices significantly increase the cost, size and weight of a generator which, in particular for vehicle applications, is highly undesirable.

For these or other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 6 illustrates a schematic diagram of the variation with time of the voltage across and the current through an excitation coil when the voltage is varied in a bipolar way according to a second switching scheme.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
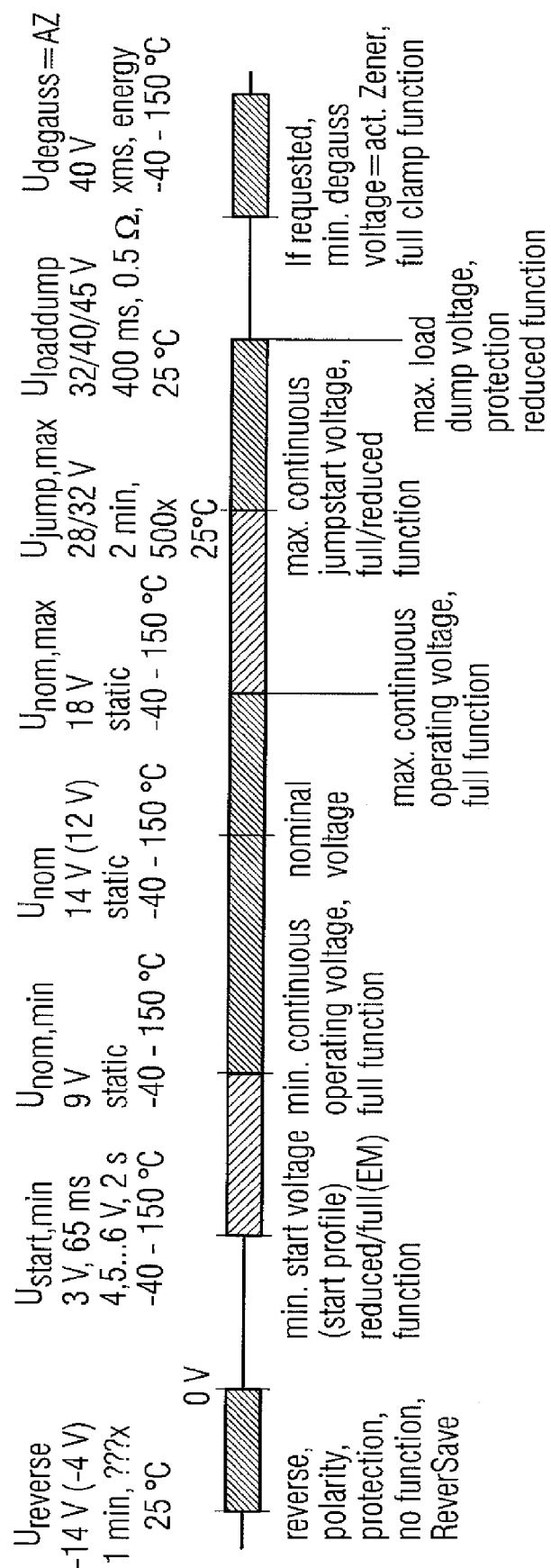
FIG. 1 illustrates an overview of the specified voltages and voltage ranges within a vehicle electrical system.
Figure 2:
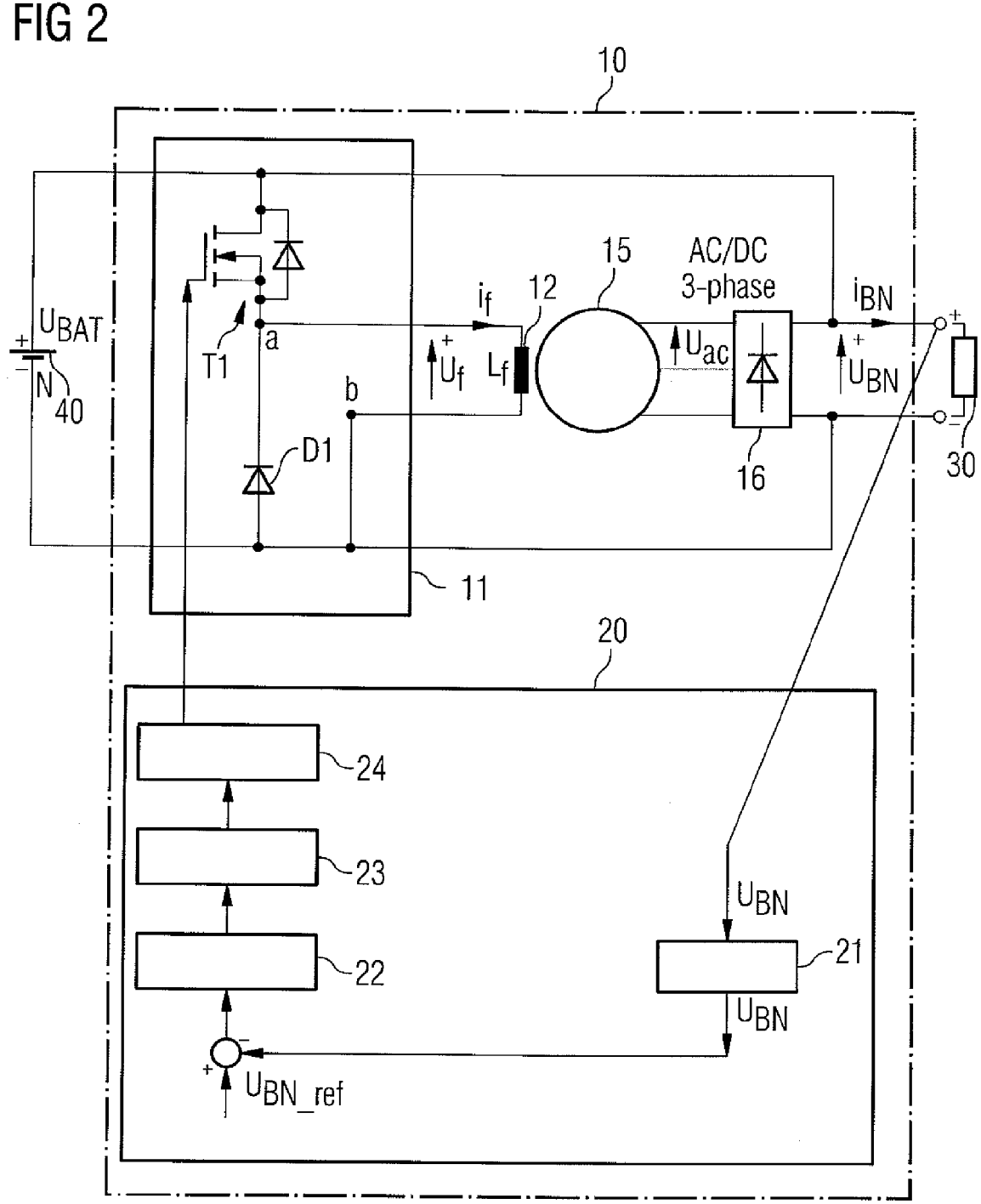
FIG. 2 illustrates a schematic, simplified diagram of a conventional generator assembly.
Figure 3:
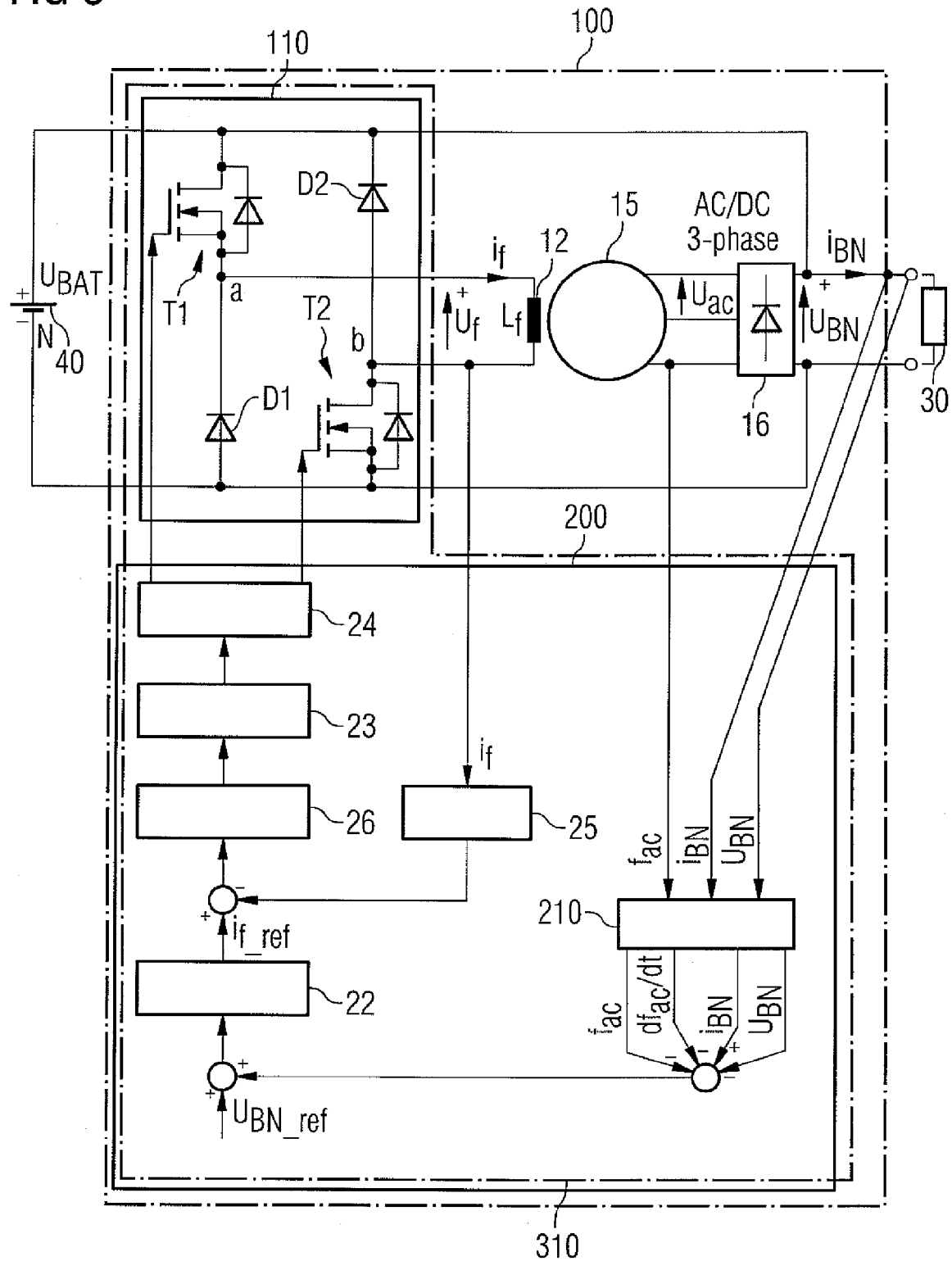
FIG. 3 illustrates a schematic, simplified diagram of the structure of a generator assembly according to an embodiment including a generator controller with current and voltage controlling and two active switches.

FIG. 3 illustrates a generator assembly 100 according to one embodiment. The generator assembly 100 may include a control circuit 310 for the excitation coil 12 of the generator 15 to rapidly control the current $i_f$ through the excitation coil 12 to an excitation coil current setpoint $i_{f\_ref}$.

The control circuit 310 may include a generator controller 200 and a field regulator circuit 110. The generator controller 200 may be configured to set the duty cycle of the two quadrant chopping circuit which may be used as the field regulator circuit 110 in this embodiment.

The two quadrant chopping circuit may include a first N-channel MOSFET transistor T1 and a first freewheeling diode D1 as a first active switch or switching means to connect, the first terminal 'a' of the excitation coil 12, respectively, either to the first, namely the positive or to the second, namely the negative terminal of the battery 40 as a voltage source with the nominal voltage $U_{BAT}$.

Furthermore, the two quadrant chopping circuit may include a second freewheeling diode D2 and a second N-channel MOSFET transistor T2 as a second active switch or switching means to connect the second terminal 'b' of the excitation coil 12, respectively, either to the first, positive or to the second, negative terminal of the battery 40.

By controlling the duty cycle of the two N-channel MOSFET transistors T1 and T2, the two quadrant chopping circuit may quickly control the excitation coil current $i_f$ to the excitation coil current setpoint $i_{ref}$ to maintain the rectified generator output voltage $U_{BN}$ at a desired level for a given rotational speed of the generator 15 and load 30 of the generator assembly 100.

During the above control process, the two quadrant chopping circuit may be forced into four different states. In a first state, both N-channel MOSFET transistors T1 and T2 may be switched on to connect terminal 'a' of the excitation coil 12 with the positive terminal of the battery 40 and terminal 'b' of the excitation coil 12 with the negative terminal of the battery 40. Hence, in the first state the excitation coil 12 is energized with a positive excitation coil voltage ($U_f = U_{BAT}$).

In a second state, switching off the N-channel MOSFET transistor T1, after a first state, while the N-channel MOSFET transistor T2 remains switched on, induces a voltage within the excitation coil 12 across the freewheeling diode D1. This voltage acts against the abrupt change of the excitation coil current $i_f$ due to the switching off of the current path through the N-channel MOSFET transistor T1 such that the freewheeling diode D1 becomes forward biased. Hence, the conducting freewheeling diode D1 connects terminal 'a' of the excitation coil 12 with the negative terminal of the battery 40 while the conducting N-channel MOSFET transistor T2 connects terminal 'b' of the excitation coil 12 also with the negative terminal of the battery 40. Thus, in the second state, the field voltage across the excitation coil 12 is 0 V ($u_f = 0V$) such that the excitation coil 12 is being degaussed.

Similarly, in a third state, switching off the N-channel MOSFET transistor T2, after a first state, while N-channel MOSFET transistor T1 remains switched on, induces a voltage within the excitation coil 12 across the freewheeling diode D2. This voltage acts against the abrupt change of the excitation coil current $i_f$ due to the switching off of the current path through the N-channel MOSFET transistor T2 such that the freewheeling diode D2 becomes forward biased. Hence, the conducting freewheeling diode D2 connects terminal 'b' of the excitation coil 12 with the positive terminal of the battery 40 while the conducting N-channel MOSFET transistor T1 connects terminal 'a' of the excitation coil 12 also with the positive terminal of the battery 40. Thus, in the third state the field voltage across the excitation coil 12 is also 0 V ($u_f = 0V$) such that the excitation coil 12 is being degaussed.

However, and in contrast to the single quadrant chopping circuit used as conventional field regulators, the two quadrant chopping circuit used as field regulator 110 according to one embodiment of the invention as illustrated in FIG. 3 allows for a fourth state. In this fourth state, switching off both N-channel MOSFET transistors T1 and T2 at once, after a first state, induces a voltage within the excitation coil 12 which leads to a first resulting voltage between the negative terminal of the battery 40 and terminal 'a' of the excitation coil 12 and a second resulting voltage between terminal 'b' of the excitation coil 12 and the positive terminal of the battery 40. These voltages act against the abrupt change of the excitation coil current $i_f$ due to the switching off of the current paths through the N-channel MOSFET transistors T1 and T2 such that both freewheeling diodes D1 and D2 become forward biased. Hence, the conducting freewheeling diode D1 connects terminal 'a' of the excitation coil 12 with the negative terminal of the battery 40 while the conducting freewheeling diode D2 connects terminal 'b' of the excitation coil 12 with the positive terminal of the battery 40. Thus, in the fourth state the field voltage across the excitation coil 12 is reversed with respect to the first state and becomes negative ($u_f = -U_{BAT}$) such that, again, the excitation coil 12 is being degaussed.

However, and in contrast to the single quadrant chopping circuit used as conventional field regulators, this negative field voltage $u_f$ allows for a very quick reduction of the excitation coil current $i_f$. This in turn can reduce the energy stored the excitation coil 12 very quickly such that the transient excess voltages of generator output voltage and the rectified generator output voltage $U_{BN}$ within the vehicle electrical system can be minimized. I.e. the possibility to apply a negative field voltage to an excitation coil enables its quicker degaussing in case of a load dump and thus helps to reduce the transient excess voltages. Correspondingly, the circuit helps to reduce the breakthrough voltages of the components of the vehicle electrical system and the number of protective component by reducing the maximum load dump voltages. Hence, the circuit leads to a significant reduction of the system costs for a vehicle's generator assembly.

The controlling of the switching between the above mentioned states of the two quadrant chopping circuit to maintain the rectified generator output voltage $U_{BN}$ at a desired level may be carried out very effectively by the generator controller 200. For that purpose, the generator controller 200 may include multiple control stages using nested control loops.

Accordingly, the embodiment illustrated in FIG. 3 includes a first, inner control loop to control the excitation coil current $i_f$ to an excitation coil current setpoint $i_{f\_ref}$. Moreover, the embodiment includes a second, outer control loop to control the rectified generator output voltage $U_{BN}$ to a rectified generator output voltage setpoint $U_{BN\_ref}$.

For the purpose of controlling the excitation coil current $i_f$, the embodiment illustrated in FIG. 3 may include a first current measuring means (not illustrated) in the current path of the excitation coil 12 or in the connection paths to the excitation coil 12 to measure the excitation coil current $i_f$. As first controlled variable the measured excitation coil current $i_f$ is received as input by a first signal conditioning means 25 to generate a first feedback signal.

According to the embodiment illustrated in FIG. 3 the first feedback signal is subtracted from the excitation coil current setpoint $i_{f\_ref}$. Furthermore with respect to the embodiment, the difference between the excitation coil current setpoint $i_{f\_ref}$ and the first feedback signal is received as input by a current controller 26. The current controller 26 generates the duty cycle for the two quadrant chopping circuit in form of a PWM control signal as input to a PWM generator 23. The PWM generator 23 in turn generates the switch-on and switch-off signals in form of a driver control signal as input to a driver circuit 24. The driver circuit 24 amplifies the switch-on and switch-off signals to trigger the gates of the N-channel MOSFET transistors T1 and T2.

In one embodiment illustrated in FIG. 3 the first, inner control loop which controls the excitation coil current $i_f$ is configured to be a relatively fast control loop with a relatively low first time constant. This additional fast, inner nested control loop helps to control the excitation coil current $i_f$ very quickly to the excitation coil current setpoint $i_{f\_ref}$ and thus helps to reduce the transient excess voltages of the generator output voltage $u_{ac}$ and the rectified generator output voltage $U_{BN}$ within the vehicle electrical system. Hence, the concept of a fast current control loop allows for low variations of the vehicle electrical system voltage and thus a fast and stable regulation of the vehicle electrical system voltage even in case of severe transient load variations.

Moreover, the embodiment illustrated in FIG. 3 includes a second, outer control loop to control the rectified generator output voltage $U_{BN}$ to a rectified generator output voltage setpoint $U_{BN\_ref}$. In the embodiment illustrated in FIG. 3 the second control loop may include a voltage measuring means (not illustrated) which may be arranged e.g., between the output terminals "+" and "−" of the generator assembly 100 to measure the rectified generator output voltage $U_{BN}$. As second controlled variable the measured rectified generator output voltage $U_{BN}$ is received as input to a second signal conditioning means 210 to generate a negative component of a second feedback signal.

According to the embodiment illustrated in FIG. 3 the second feedback signal is added to the rectified generator output voltage setpoint $U_{BN\_ref}$. Furthermore with respect to the embodiment, the sum of the rectified generator output voltage setpoint $U_{BN\_ref}$ and the second feedback signal is received as input to the voltage controller 22 to generate the excitation coil current setpoint $i_{ref}$.

Moreover, in the embodiment illustrated in FIG. 3, the second control loop further includes a second current measuring means (not illustrated). This second current measuring means may be arranged in the connection paths of the output terminals "+" and "−" of the generator assembly 100 for measuring a rectified generator output current $i_{BN}$ as feed-forward component and further input to the second signal conditioning means 210 to generate a further, however, positive component of the second feedback signal.

Furthermore, according to the embodiment illustrated in FIG. 3, the second control loop further includes a frequency measuring means (not illustrated). This frequency measuring means may be arranged between the ac output terminals of the generator 15 for measuring the frequency $f_{ac}$ of the ac generator output voltage as feed-forward component and further input to the second signal conditioning means 210 to generate a further negative component of the second feedback signal. Feeding forward the frequency $f_{ac}$ of the ac generator output voltage allows for fast compensating changes of the vehicle electrical system voltage due transient changes of the number of revolutions of the generator 15.

In the embodiment illustrated in FIG. 3 the second signal conditioning means 210 may generate a rate of change with time signal $df_{ac}/dt$ of the frequency of the ac generator output voltage as a further negative feed-forward component of the second feedback signal. Feeding forward the rate of change with time $df_{ac}/dt$ of the frequency of the ac generator output voltage allows for an even faster and more precise compensation of changes of the vehicle electrical system voltage due transient changes of the number of revolutions of the generator.

According to the embodiment illustrated in FIG. 3, all of the above mentioned components of the second feedback signal are summed up by a summing circuit prior to being added to the rectified generator output voltage setpoint $U_{BN\_ref}$.

In the embodiment illustrated in FIG. 3, the above described second, outer control loop which controls the rectified generator output voltage $U_{BN}$ is configured to be a relatively slow control loop with a relatively higher second time constant. In particular, the second (voltage) control loop is typically slower than the first (current) control loop. The correspondingly slower voltage controller 22 within the second, outer control loop sets the excitation coil current setpoint $i_{ref}$ (also referred to excitation coil reference current) for the faster current controller 26 within the nested first inner control loop.

The performance of the generator regulation by the generator controller directly influences the quality and stability of vehicle electrical system voltage. In order to analyze the factors which may influence the controlling process the static equation for a vehicle electrical system generator may be considered:

$$u_{AC} = \frac{u_{BN}}{2.34} = c_1 \cdot \Psi_f \cdot n = c_2 \cdot i_f \cdot n$$

Therein the voltage $u_{AC}$ represents the ac generator output voltage, $U_{BN}$ is the rectified generator output voltage (also referred to as the vehicle electrical system voltage), $\Psi_f$ is the magnetic flux of the excitation coil, $i_f$ the excitation coil current, n is the number of revolutions per minute of the generator and $c_1$ as well as $c_2$ are motor constants.

The above equation confirms that a fast regulation of the excitation coil current—either direct or indirect—helps to quickly control the generator output voltage. This is particularly important during the degaussing of the excitation coil in case of a load dump. As mentioned before, these load dumps represent a main cause of the over dimensioning of semiconductor components in vehicles.

Furthermore, the above equation also confirms that changes of the number n of revolutions per minute of the generator caused by changes of the number of revolutions per minute n of the vehicle's combustion engine result in changes of the vehicle electrical system voltage. Accordingly, measuring of the number n of revolutions per minute of the generator or of the frequency of the ac generator output voltage (which are, of course, correlated) help to compensate the changes of the vehicle electrical system voltage quickly.

Figure 4:
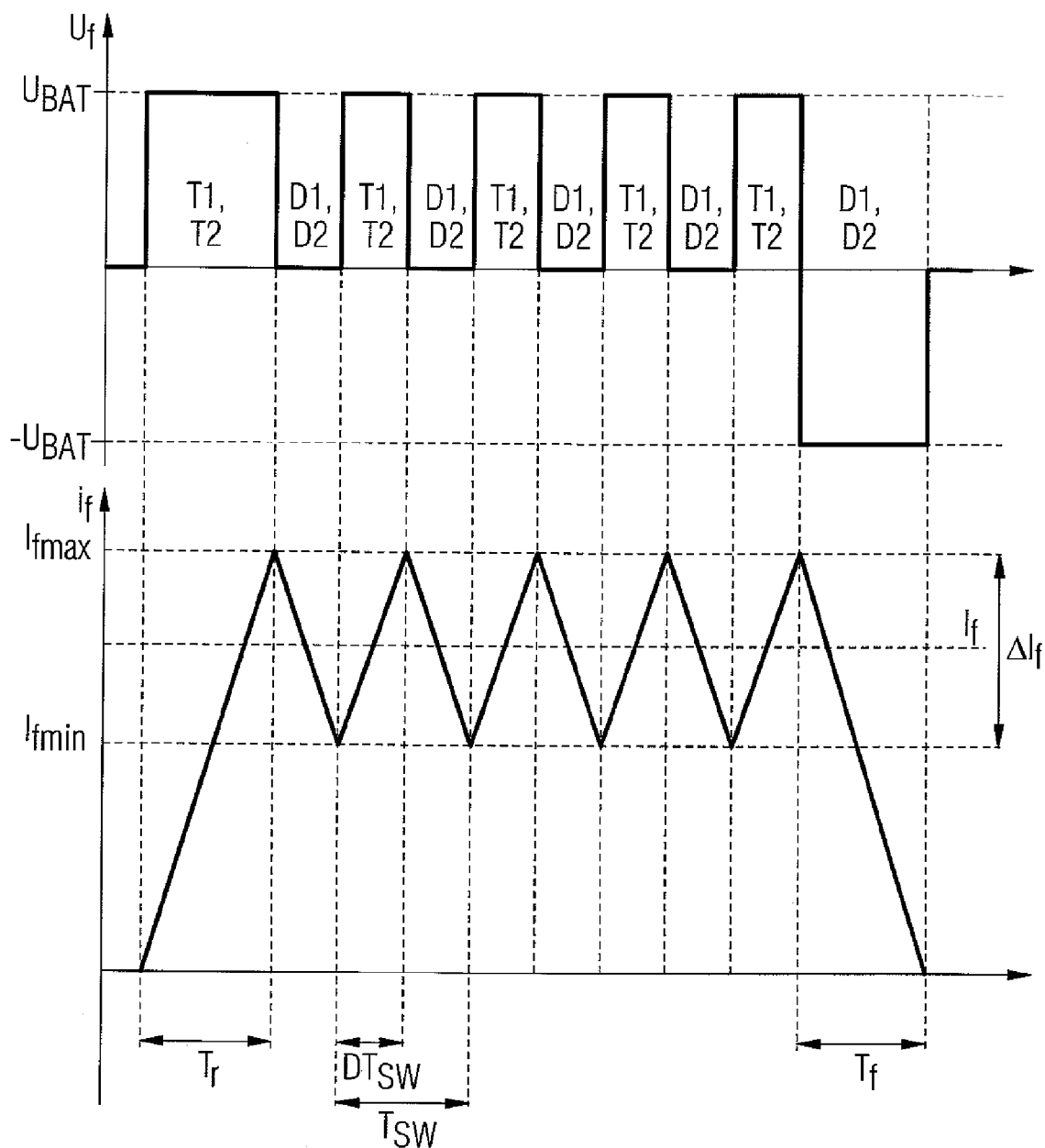
FIG. 4 illustrates a schematic diagram of the variation with time of the voltage across and the current through an excitation coil when the voltage is varied in a unipolar way according to a first switching scheme by a control circuit of an embodiment.

Now referring to FIG. 4, a schematic diagram of the variations with time of the voltage $u_f$ across and the current $i_f$ through an excitation coil is illustrated when the voltage $u_f$ is varied in a unipolar way according to a first switching scheme by a control circuit of an embodiment of the invention.

This first switching scheme of the active switching using a control circuit according to an embodiment of the invention—like for instance a two quadrant chopping circuit with two MOSFET transistors T1 and T2 as well as two freewheeling diodes D1 and D2, as e.g., the two quadrant chopping circuit in FIG. 3—may be structured as follows:

As the upper part of the diagram in FIG. 4 illustrates—starting from the left, the two quadrant chopping circuit may be initially driven into the first state, wherein both N-channel MOSFET transistors T1 and T2 are switched on to connect terminal 'a' of the excitation coil 12 with the positive terminal of the battery 40 and terminal 'b' of the excitation coil 12 with the negative terminal of the battery 40. Hence, during the initial first state the excitation coil 12 is energized for a period $T_r$ with a positive excitation coil voltage ($u_f = U_{BAT}$) such that the excitation coil current $i_f$ rises up to a predetermined maximum value $I_{fmax}$ as illustrated by the lower part of the diagram in FIG. 4.

Following the first state, the two quadrant chopping circuit may subsequently be driven into the second state wherein the N-channel MOSFET transistor T1 is switched off while the N-channel MOSFET transistor T2 remains switched on, such that the freewheeling diode D1 becomes forward biased. Hence, the freewheeling diode D1 connects terminal 'a' of the excitation coil 12 with the negative terminal of the battery 40 while the conducting N-channel MOSFET transistor T2 connects terminal 'b' of the excitation coil 12 also with the negative terminal of the battery 40. Thus, in the second state the field voltage across the excitation coil 12 is 0 V ($u_f = 0V$) such that the excitation coil current $i_f$ drops down to a predetermined minimum value $I_{fmin}$. Accordingly, the excitation coil 12 is degaussed for a corresponding amount.

According to the example in FIG. 4, after the above mentioned second state, the two quadrant chopping circuit may subsequently be driven into the first state again, thereafter into the second state again and so on. I.e. the switching between the states repeats periodically with the period $T_{sw}$ such that, on average, the excitation coil current $i_f$ amounts to an average value $I_f$ which may be the excitation coil current setpoint $i_{ref}$.

As can be seen from the lower part of FIG. 4 the average value $I_f$ of the excitation coil current $i_f$ can be conveniently controlled by modifying the duty cycle of the switching period $T_{sw}$, i.e. the ratio of the period $DT_{sw}$ during which the two quadrant chopping circuit is in the first state and the period $T_{sw} - DT_{sw}$ during which the two quadrant chopping circuit is in the second (or third) state. Furthermore, the average value $I_f$ of the excitation coil current $i_f$ might be controlled by modifying the predetermined maximum $I_{fmax}$ and minimum $I_{fmin}$ values of the excitation coil current $i_f$ which may define when a switching process might be initiated.

When using a two quadrant chopping circuit, the above described switching scheme can be modified insofar as instead of driving the two quadrant chopping circuit into the second state to reduce the excitation coil current, the two quadrant chopping circuit might as well be driven into the third state. Therein the N-channel MOSFET transistor T2 is switched off while the N-channel MOSFET transistor T1 remains switched on such that the freewheeling diode D2 becomes forward biased. Hence, the freewheeling diode D2 connects terminal 'b' of the excitation coil 12 with the positive terminal of the battery 40 while the N-channel MOSFET transistor T1 connects terminal 'a' of the excitation coil 12 also with the positive terminal of the battery 40. Thus, in the third state the field voltage across the excitation coil 12 is also 0 V ($u_f = 0V$).

The switching pattern as illustrated in the upper part of FIG. 4 might as well be generated in a third way, namely by e.g.,—after a first state—alternately driving the two quadrant chopping into the second or the third state. All of the above described switching schemes for the active switching means result in a unipolar pulse-width modulated (PWM) pattern of the voltage $u_f$ across the excitation coil. In this context, unipolar switching refers to the fact that the excitation coil current $i_f$ and the corresponding excitation coil voltage $u_f$ either share their polarity (e.g., both positive) or are zero at any given time.

In contrast to FIG. 4, FIG. 6 illustrates a schematic diagram of the variation with time of the excitation voltage $u_f$ and the excitation coil current $i_f$ when the excitation coil voltage $u_f$ is varied in a bipolar way according to a second switching scheme.

This second switching scheme of the active switching using a control circuit according to a further embodiment of the invention—like for instance a two quadrant chopping circuit with two MOSFET transistors T1 and T2 as well as two freewheeling diodes D1 and D2, as e.g., the two quadrant chopping circuit in FIG. 3—may be structured as follows:

As the upper part of the diagram in FIG. 6 illustrates—starting from the left, the two quadrant chopping circuit may be initially driven into the first state, wherein both N-channel MOSFET transistors T1 and T2 are switched on to connect terminal 'a' of the excitation coil 12 with the positive terminal of the battery 40 and terminal 'b' of the excitation coil 12 with the negative terminal of the battery 40. Hence, during the initial first state the excitation coil 12 is energized for a period $T_r$ with a positive excitation coil voltage ($u_f=U_{BAT}$) such that the excitation coil current $i_f$ rises up to a predetermined maximum value $I_{fmax}$.

According the example in FIG. 6, following the first state, the two quadrant chopping circuit may subsequently be driven into the fourth state wherein both N-channel MOSFET transistors T1 and T2 are switched off such that both freewheeling diodes D1 and D2 become forward biased. Hence, the conducting freewheeling diode D1 connects terminal 'a' of the excitation coil 12 with the negative terminal of the battery 40 while the conducting freewheeling diode D2 connects terminal 'b' of the excitation coil 12 with the positive terminal of the battery 40. Thus, in the fourth state the field voltage across the excitation coil 12 is reversed with respect to the first state and becomes negative ($u_f=-U_{BAT}$) such that the excitation coil current $i_f$ drops down to a predetermined minimum value $I_{fmin}$. Accordingly, the excitation coil 12 is degaussed for a corresponding amount.

According to the example in FIG. 6, after the above mentioned fourth state, the two quadrant chopping circuit may subsequently be driven into the first state again, thereafter to the fourth state again and so on. I.e. the switching between the states repeats periodically with the period $T_{sw}$ such that, on average, the excitation coil current $i_f$ amounts to an average value $I_f$ which may be the excitation coil current setpoint $i_{ref}$.

However, and in contrast to the first, unipolar switching scheme as illustrated in FIG. 4, the above described second switching scheme for the active switching means results in a bipolar pulse-width modulated (PWM) pattern of the voltage $u_f$ across the excitation coil. In this context, bipolar switching refers to the fact that, with respect to the excitation coil current $i_f$, the corresponding excitation coil voltage $U_f$ alternates in polarity during a switching period $T_{sw}$.

Furthermore, and still in contrast to the first, unipolar switching scheme as illustrated in FIG. 4, when using a bipolar switching scheme as illustrated in FIG. 6 the negative excitation voltage $u_f$ helps to drive down the excitation coil current $i_f$ by a bigger amount within the same period of time ($DT_{sw}$), i.e. relatively faster. I.e., compared to the unipolar switching scheme as illustrated in FIG. 4, the bipolar switching scheme as enabled by the two quadrant chopping circuit enables to control the excitation coil current $i_f$ faster to an average value $I_f$ or to an excitation coil current setpoint $i_{ref}$ within the same switching period $T_{sw}$ by correspondingly modifying the duty cycle.

Figure 5:
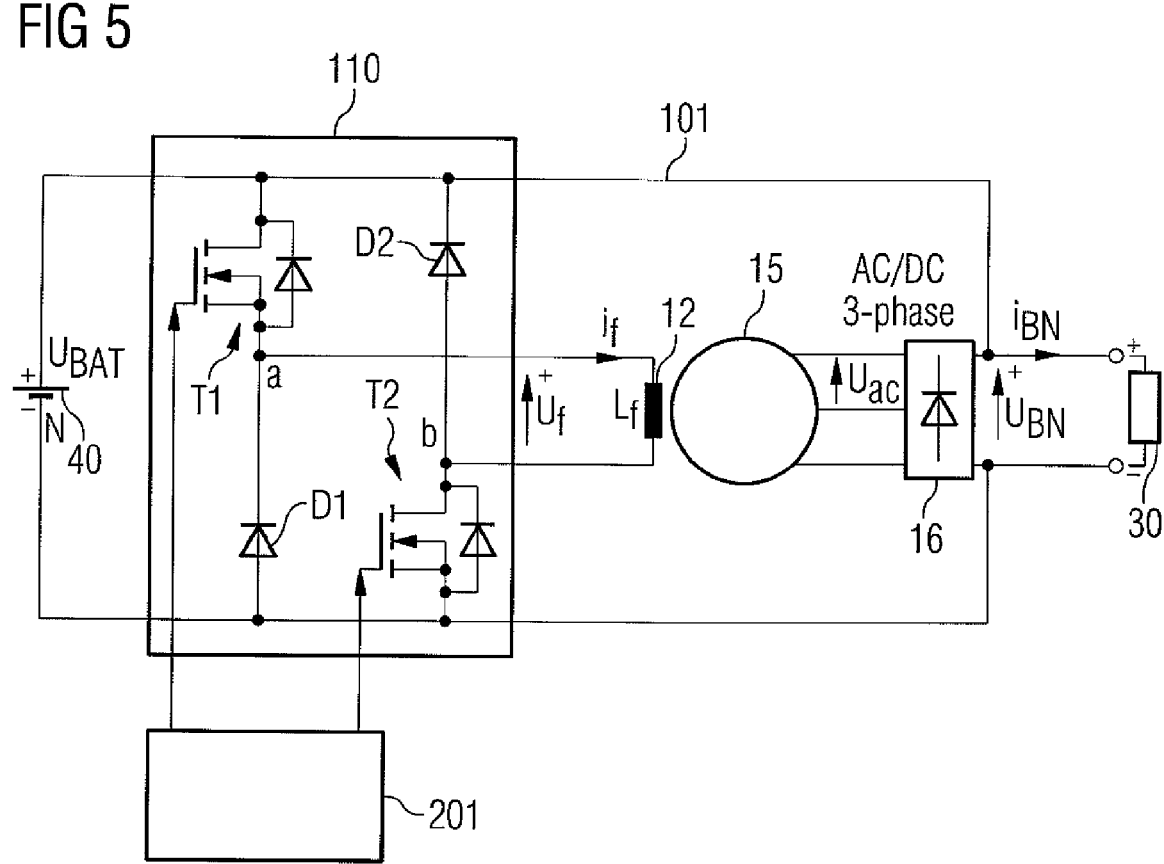
FIG. 5 illustrates a schematic, simplified diagram of a generator assembly according to a further embodiment.

FIG. 5 illustrates a schematic diagram of a generator assembly 101 according to a further embodiment of the invention. In this embodiment, an alternative generator controller 201 is implemented without an internal current control loop.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. Furthermore, it will be readily apparent those skilled in the art that many of the specific features specified in the above description are in no way limiting and a variety of alternatives may be produced. Non-limiting examples of example modifications which may be made to the above described generator assemblies are discussed hereafter.

Although it has been described above that N-channel MOSFET transistors may be used as switching devices within a two quadrant chopping circuit, insulated-gate bipolar transistors (IGBTs) or other switching devices might as well be used.

Furthermore, for instance, transistor T1 may be implemented as p-channel MOSFET as well.

Furthermore, the generator controller allows for analog or digital implementations.

The current measurement of the excitation coil current for the internal current control loop, e.g., the first, inner current control loop as described above may be implemented within the excitation coil, within components of the active switching means as for instance the MOSFET transistors or the freewheeling diodes or in the intermediate circuit (both at the "+" and the "−" terminal).

The current measurement of the rectified generator output current for the external voltage control loop, e.g., the second, outer voltage control loop as described above may be implemented within the vehicle electrical system, at the battery terminals or the ac output terminals of the generator.

The voltage measurement for the external voltage control loop, e.g., the second, outer voltage control loop as described above may be implemented within the vehicle electrical system, at the battery terminals or the ac output terminals of the generator.

It should be noted that a frequency measurement of the ac generator output voltage is not necessary for the transient excess voltage protection.

Finally it is pointed out that this application is intended to cover any adaptations or variations of the specific embodiments discussed herein. Therefore, it is intended that this invention be limited only by the claims and the equivalents thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An control circuit comprising:
    a first active switching circuit to connect a first terminal of an excitation coil either to a first or to a second terminal of a voltage source;
    a second active switching circuit to connect a second terminal of the excitation coil either to the first or to the second terminal of the voltage source; and
    a generator controller to set the duty cycle of the first and/or second active switching circuit to rapidly control the current through the excitation coil to an excitation coil current setpoint.

2. The control circuit of claim 1, wherein the first and/or second active switching circuit comprises a two quadrant chopping circuit.

3. The control circuit of claim 1, wherein the generator controller comprises a first control loop to control the excitation coil current.

4. The control circuit of claim 3, wherein the first control loop comprises:
    a first current measuring device configured to measure the excitation coil current as input to a first signal conditioning device to generate a first feedback signal to be subtracted from the excitation coil current setpoint as input to a current controller to generate a pulse width modulation (PWM) control signal as input to a PWM generator to generate a driver control signal as input to a driver circuit coupled to the first and/or second active switching circuit to control the duty cycle of the first and/or second active switching circuit.

5. The control circuit of claim 3, wherein the generator controller further comprises a second control loop to control an rectified output voltage of the generator to a rectified generator output voltage setpoint.

6. The control circuit of claim 5, wherein the second control loop comprises:
a voltage measuring device configured to measure the rectified output voltage of the generator as input to a second signal conditioning device to generate a second feedback signal to be subtracted from the rectified generator output voltage setpoint as input to a voltage controller to generate the excitation coil current setpoint.

7. The control circuit of claim 6, wherein the second control loop further comprises a second current measuring device for measuring a rectified output current of the generator as further input to the second signal conditioning device.

8. The control circuit of claim 6, wherein the second control loop further comprises a frequency measuring device for measuring the frequency of an ac generator output voltage as further input to the second signal conditioning device.

9. The control circuit of claim 8, wherein the second signal conditioning device further generates a rate of change with time of the frequency of the ac generator output voltage as part of the second feedback signal.

10. The control circuit of claim 2, wherein the two quadrant chopping circuit comprises at least two N-Channel MOSFET transistors.

11. The control circuit of claim 2, wherein the two quadrant chopping circuit comprises at least two insulated-gate bipolar transistors (IGBTs).

* * * * *